United States Patent
Lee et al.

(10) Patent No.: US 7,724,726 B2
(45) Date of Patent: May 25, 2010

(54) DATA TRANSMISSION SYSTEM FOR DYNAMICALLY ADJUSTING PDU LENGTH, METHOD THEREOF, AND COMPUTER-READABLE RECORDING MEDIUM

(75) Inventors: Kun-Hung Lee, Taipei (TW); Wei-Cheng Wu, Taipei (TW)

(73) Assignee: Institute For Information Industry, Taipei (TW)

( * ) Notice: Subject to any disclaimer, the term of this patent is extended or adjusted under 35 U.S.C. 154(b) by 585 days.

(21) Appl. No.: 11/715,996

(22) Filed: Mar. 9, 2007

(65) Prior Publication Data

US 2008/0130609 A1 Jun. 5, 2008

(30) Foreign Application Priority Data

Dec. 1, 2006 (TW) ............... 95144832 A

(51) Int. Cl.
*H04J 3/24* (2006.01)
(52) U.S. Cl. .................. 370/349; 370/395.52; 370/470; 370/465
(58) Field of Classification Search .................. 370/349, 370/464–479, 395.52
See application file for complete search history.

(56) References Cited

U.S. PATENT DOCUMENTS

| | | | | |
|---|---|---|---|---|
| 4,920,537 A | * | 4/1990 | Darling et al. | 714/704 |
| 2004/0017814 A1 | * | 1/2004 | Shimada | 370/395.52 |
| 2004/0252719 A1 | * | 12/2004 | Jami et al. | 370/470 |
| 2006/0007952 A1 | * | 1/2006 | Oishi et al. | 370/465 |

* cited by examiner

*Primary Examiner*—Lun-Yi Lao
*Assistant Examiner*—Michael Nguyen
(74) *Attorney, Agent, or Firm*—Rabin & Berdo, P.C.

(57) ABSTRACT

A data transmission system for dynamically adjusting a protocol data unit (PDU) length and a method thereof are provided. The data transmission system at least includes a transmitting terminal and a receiving terminal. After a connection is established between the transmitting terminal and the receiving terminal, data is transmitted through a predetermined first data message PDU. When the receiving terminal found that an error rate of the PDU is excessively high, a second data message PDU length is calculated, and the transmitting terminal is informed to use the most appropriate PDU length to transmit data. The data transmission system dynamically adjusts the PDU length to achieve the effect of enhancing the data transmission capacity, so as to solve the problems concerning power consumption and interference between users caused by the process of enhancing the data transmission capacity by way of increasing the transmission power.

16 Claims, 4 Drawing Sheets

DATA TRANSMISSION SYSTEM FOR DYNAMICALLY ADJUSTING PDU LENGTH, METHOD THEREOF, AND COMPUTER-READABLE RECORDING MEDIUM

CROSS-REFERENCE TO RELATED APPLICATIONS

This non-provisional application claims priority under 35 U.S.C. §119(a) on Patent Application No(s). 095144832 filed in Taiwan, R.O.C. on Dec. 1, 2006, the entire contents of which are hereby incorporated by reference.

BACKGROUND OF THE INVENTION

1. Field of Invention

The present invention relates to a data transmission technology for dynamically adjusting a PDU length according to the bit error rate when packets are transmitted over the network.

2. Related Art 3G refers to the third generation, which is an abbreviation of the third generation mobile phone. Compared with the first generation mobile phone system of Advanced Mobile Phone System (AMPS), the second generation mobile phone system of Global System for Mobile Communications (GSM), and 2.5G General Packet Radio Service (GPRS) constructed on the second generation mobile communication device, 3G provides a higher communication quality and a higher transmission capacity and transmission speed. Different from the usual mobile communication which is mainly applied in voice service, short message service, and value-added service, 3G can transmit dynamic images and high-definition frame. In terms of wireless communication technology, 3G utilizes radio frequency bands higher than before, and has the following main specifications, including Wideband Code Division Multiple Access (WCDMA) and Code Division Multiple Access 2000 (CDMA2000).

Currently, WCDMA is mainly applied in Universal Mobile Telecommunication System (UMTS) and 3G system in Japan. This technology makes the 3G mobile communication be optimized, and makes the 2 GHz frequency band be sufficiently used. The data communication function of the WCDMA is similar to that of a computer network, and the WCDMA is generally divided into four layers, namely, a physical layer, a transport network layer, a radio network layer, and a system network layer. When the data needs to be transmitted, the data is divided into a plurality of data packets with a certain length, and once the connection is established, the data packets are transmitted. If the data packets are seriously lost, the physical layer adjusts the transmission power or the spread factor through power control, so as to reduce the bit error rate (ber) and reduce the block error rate, thereby increasing the effective data transmission and reducing the packet loss rate. However, when an error occurs to most of the data packets, adjusting the transmission power or the spread factor requires enhancing the transmission power and thereby increasing the power consumption, which causes signal interference between users, indirectly influences the transmission quality, such that the overall packet loss rate is increased.

SUMMARY OF THE INVENTION

In view of the above problems, the present invention is directed to providing a data transmission system for dynamically adjusting a protocol data unit (PDU) length and a method thereof. The present invention dynamically adjusts the PDU length according to the bit error rate (ber) or Block Error Rate (BER) of data transmission, so as to achieve a high transmission capacity, thereby solving the problem in the conventional art that once the transmission power is increased, the power consumption is increased accordingly and other users' transmission quality is influenced.

In order to achieve the above objective, the present invention is achieved through two aspects, namely, system and method. The system provided by the present invention at least comprises a transmitting terminal and a receiving terminal. The transmitting terminal is used to transmit the data in the form of packets through a predetermined first data message PDU. After an Acknowledged Mode Radio Link Control (AM RLC) connection is established between the receiving terminal and the transmitting terminal, the receiving terminal receives the data according to the length of the first data message PDU transmitted from the transmitting terminal, and calculates the ber or the BER of the first data message PDU, so as to calculate an appropriate second data message PDU length, and provide a PDU change request, such that the transmitting terminal continuously transmits data with the second data message PDU length. Furthermore, the transmitting terminal measures a retransmission rate of the first data message PDU, and when the transmitting terminal found that the retransmission rate changes, it calculates an appropriate third data message PDU length according to the ber or BER of the first data message PDU responded from the receiving terminal, and provides the PDU change request, thereby informing the receiving terminal to receive the data with the third data message PDU length.

No matter the transmitting terminal or the receiving terminal, it is informed through a PDU change request to transmit the data with the appropriate second data message PDU length or the appropriate third data message PDU length.

The PDU formats used in this system at least comprise the following three types. One is the data message PDU, which is transmitted from the transmitting terminal to the receiving terminal, and the transmitting terminal carries the data required for being transmitted by the upper layer, so as to form a packet for being transmitted to the receiving terminal. The above first data message PDU, the second data message PDU, and the third data message PDU all fall into the scope of this category. The second type is a data acknowledgement message PDU, which is transmitted from the receiving terminal to the transmitting terminal, different from the data message PDU, and used for providing information about the receiving state of the data message PDU. The third type is the data message length change requirement PDU, which is transmitted from the receiving terminal to the transmitting terminal, for informing the transmitting terminal to adjust the length of the data message PDU, and the above PDU change request falls in the scope of this category. The data message PDU at least comprises a sequence number field, a data length reset bit field, and a length field. The data acknowledgement message PDU at least comprises a sequence number field and a data message receiving state field. The data message length change requirement PDU at least comprises a changed PDU length filed.

The data transmission method provided by the present invention comprises the following steps. First, a connection is established between a transmitting terminal and a receiving terminal in Step (A). In Step (B), the transmitting terminal transmits data to the receiving terminal with a first data message PDU. In Step (C), the receiving terminal sends a PDU change request to the transmitting terminal. Finally, in Step (D), the transmitting terminal utilizes a second data message PDU in the PDU change request to transmit the subsequent data to the receiving terminal. The above connection is an AM RLC connection.

Each of the above steps (A) to (D) comprises a plurality of sub-steps, and Step (A) further comprises the following sub-steps: first, the transmitting terminal/receiving terminal transmits a radio resource control (RRC) message comprising a plurality of PDU lengths, so as to protocol a plurality of available PDUs between the transmitting terminal and the receiving terminal; then, the RRC message is received by the receiving terminal/transmitting terminal, and a corresponding PDU length is established. Step (B) further comprises the following steps: first, the transmitting terminal sets the data length reset bit of the first data message PDU as 0; next, upon receiving the first data message PDU, the receiving terminal takes the length of the first data message PDU as the used PDU length. Step (C) further comprises: first, the receiving terminal calculates the ber or BER of the received first data message PDU, and informs the transmitting terminal about a message of ber or BER with a PDU change request or a response message; next, the receiving terminal determines whether to change the used PDU length or not according to the information of the ber or BER, and calculates a PDU length that achieves the maximum bandwidth utilization as the length of the second data message PDU, wherein the receiving terminal informs the transmitting terminal about the length of the second data message PDU with the PDU change request. Step (D) further comprises the following sub-steps: the transmitting terminal sets the length of the second data message PDU according to the received PDU change request, and sets the data length reset bit of the second data message PDU as 1 when transmitting the second data message PDU for the first time; then, the receiving terminal changes the PDU length used by the receiving terminal, upon receiving the second data message PDU with the data length reset bit as 1.

It should be noted that, when the transmitting terminal found that the average error rate or the retransmission request rate of the first data message PDU is changed, it calculates an appropriate PDU length as the length of the third data message PDU according to the information fed back by the receiving terminal, such as ber, and transmits the data through the third data message PDU. When the transmitting terminal transmits the third data message PDU for the first time, it further sets the data length reset bit of the third data message PDU as 1.

In view of the above, the present invention dynamically adjusts the PDU length, and reduces the PDU length when the error rate or the retransmission rate of the transmitted PDU is increased, so as to reduce the possibility of the transmission error. Under the tolerable error rate, the PDU length is enlarged, so as to enhance the bandwidth utilization. Compared with the conventional art, the present invention effectively enhances the data transmission capacity and reduces the transmission error rate without increasing power consumption, and avoids the defect of the conventional art that the transmission quality is deteriorated due to the increase of the transmission power.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

To make the above and other objectives, features, and advantages of the present invention more comprehensible, the present invention is illustrated below in great details through an embodiment with reference to the accompanying drawings.

Figure 1:
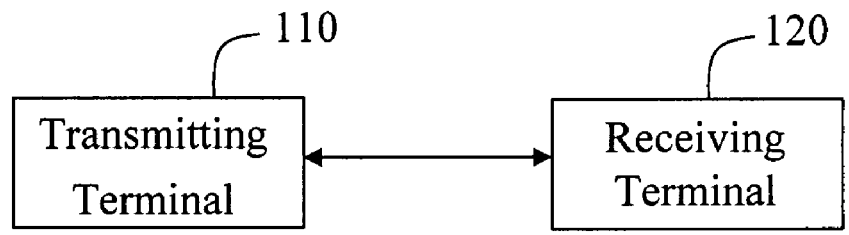
FIG. 1 is a schematic view of a data transmission system for dynamically adjusting a PDU length according to an embodiment of the present invention.

The present invention provides a data transmission system for dynamically adjusting a protocol data unit (PDU) length, applicable to a Wideband Code Division Multiple Access (WCDMA) network, which mainly aims at reducing the error rate in transmitting PDU and enhancing the bandwidth utilization of the WCDMA network by dynamically adjusting the size of the PDU. FIG. 1 is a schematic view of a data transmission system for dynamically adjusting the PDU length according to an embodiment of the present invention. Referring to FIG. 1, in this embodiment, the system at least includes a transmitting terminal 110 and a receiving terminal 120. The transmitting terminal 110 is used to transmit data by dividing the data into a plurality of PDU packets with a predetermined PDU length. The receiving terminal 120 is used to receive the data according to a first data message PDU transmitted from the transmitting terminal 110 after establishing an Acknowledged Mode Radio Link Control (AM RLC) connection with the transmitting terminal 110, and calculates a ber or a BER of the first data message PDU, so as to calculate an appropriate length of a second data message PDU, and provide a PDU change request to inform the transmitting terminal 110 to adjust the length of the transmitted PDU, so as to continuously receive the subsequent data. In this embodiment, alternatively, the transmitting terminal 110 calculates an appropriate length of a third data message PDU according to a retransmission rate of the retransmitted first data message PDU or according to the ber or the BER of the first data message PDU, and informs the receiving terminal 120 to receive data with the third data message PDU length through the PDU change request. No matter the transmitting terminal 110 or the receiving terminal 120, a PDU change request is required for informing about the changing of an appropriate PDU for continuously transmitting or receiving data.

Before illustrating the relationship between the transmitting terminal 110 and the receiving terminal 120 of this embodiment, different types of the PDU mentioned in the embodiment of the present invention are defined first. In this embodiment, the PDU at least includes three types: a data message PDU, a data acknowledgement message PDU, and a data message length change requirement PDU. The data message PDU is the main packet for data transmission. The transmitting terminal 110 divides the data required for being transmitted by an upper layer thereof into packets with the data message PDU, and the data is transmitted to the receiving terminal 120 by the transmitting terminal 110. The data acknowledgement message PDU is a packet for feeding back the receiving state of the data message PDU from the transmitting terminal 110 after the receiving terminal 120 has received the data message PDU from the transmitting terminal 110. The data message length change requirement PDU is a packet for informing the sending terminal 110 about the changing message when the receiving terminal 120 or the transmitting terminal 110 found that the packet size of the data message PDU needs to be changed, and after receiving the data message length change requirement PDU, the transmitting terminal 110 adjusts the length of the transmitted data message PDU accordingly. The above first data message PDU, the second data message PDU, and the third data message PDU all belong to the scope of the data message PDU, and the PDU change request belongs to the scope of the data message length change requirement PDU, which will not be further described in the subsequent paragraphs any more.

Figure 2A:
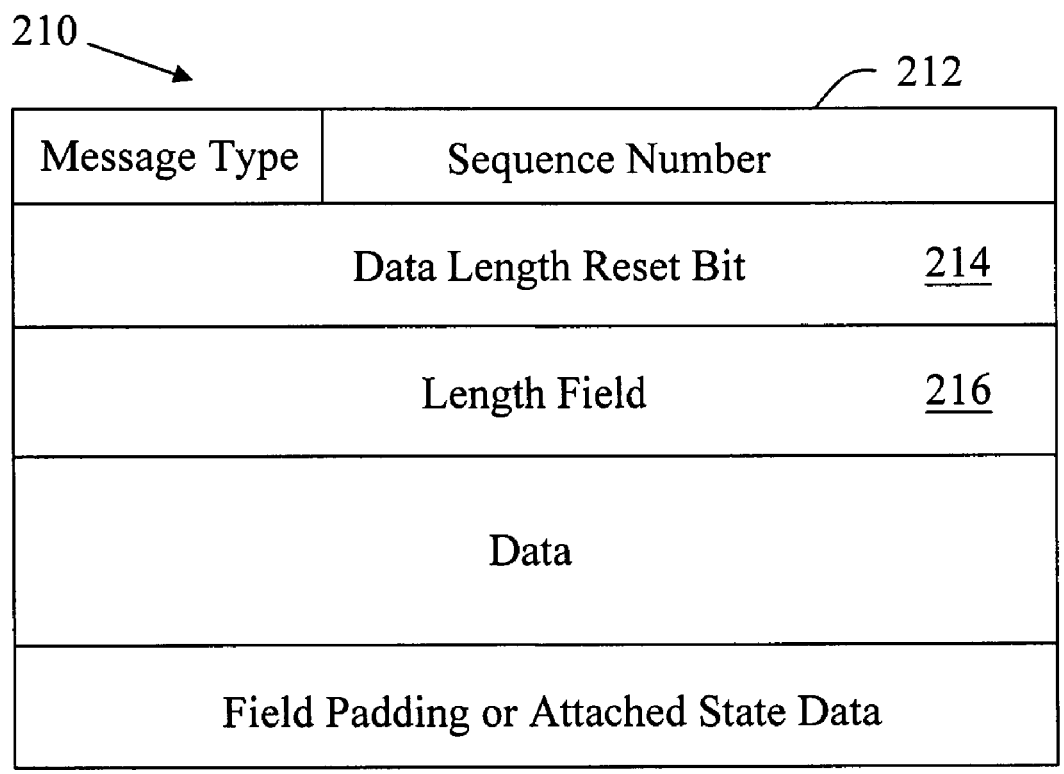
FIG. 2A is a schematic view of a data message PDU according to an embodiment of the present invention.

Then, the above three types of PDU are further described below. FIG. 2A is a schematic view of a data message PDU according to this embodiment. Referring to FIG. 2A, the data message PDU 210 (briefly referred to as PDU 210) includes a plurality of fields that are respectively used for recording information relevant to the transmitted data and the PDU 210. Besides data field, PDU 210 at least further includes fields such as a sequence number 212, a data length reset bit 214, and a length field 216. The sequence number 212 is used to record the sequence for transmitting each PDU 210 between the transmitting terminal 110 and the receiving terminal 120. The data length reset bit 214 is a field of 1-bit divided from the currently existed HE field (not shown in FIG. 2A), and the field 214 is also referred to as an R field. When the data length reset bit is set as 0, it indicates that the PDU length does not need to be changed, and the original length of PDU 210 is taken as a predetermined PDU 210 length for receiving; otherwise, it indicates that the receiving terminal 120 needs to change the predetermined PDU length for receiving. When the receiving terminal 120 found that the data length reset bit of PDU 210 is 1, the records of the length field 216 of the PDU 210 is further looked up, so as to obtain the updated length of PDU 210.

Figure 2B:
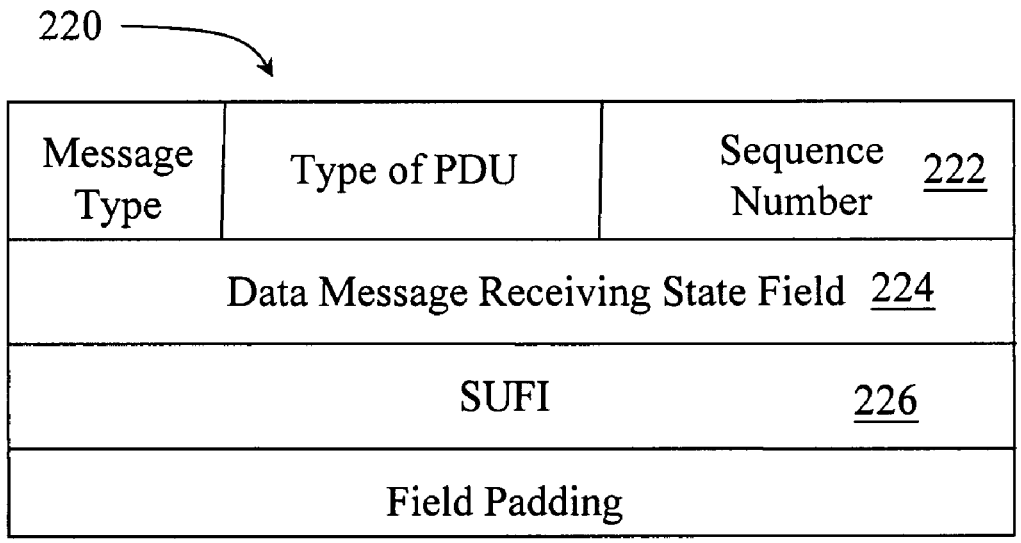
FIG. 2B is a schematic view of a data acknowledgement message PDU according to an embodiment of the present invention.

FIG. 2B is a schematic view of a data acknowledgement message PDU according to an embodiment of the present invention. Referring to both FIG. 2A and FIG. 2B, when the receiving terminal 120 receives the PDU 210 transmitted from the transmitting terminal 110, the receiving terminal 120 uses the data acknowledgement message PDU (briefly referred to as PDU 220) to acknowledge to the transmitting terminal 110 that it has received the PDU 210. The fields of PDU 220 at least include a sequence number 222, a data message receiving state field 224, and a super field (SUFI) 226. The sequence number 222 is used to determine the sequence for transmitting the PDU 220. The data message receiving state field 224 is used to record that the transmitting state of the PDU 210 is successful or failure, and whether it requires retransmitting PDU 210 or not. It shall be noted that, after receiving the PDU 210, the receiving terminal 120 detects whether an error occurs to the PDU 210 or not, and calculates a bit error rate (ber) and a Block Error Rate (BER) of the PDU 210. The receiving terminal 120 may record the ber or the BER in the SUFI field 226 of the PDU 220. The BER is obtained through an equation, e.g., $BER=(1-(1-ber)^{PDU\ length})$, which is not limited in this embodiment.

Figure 2C:
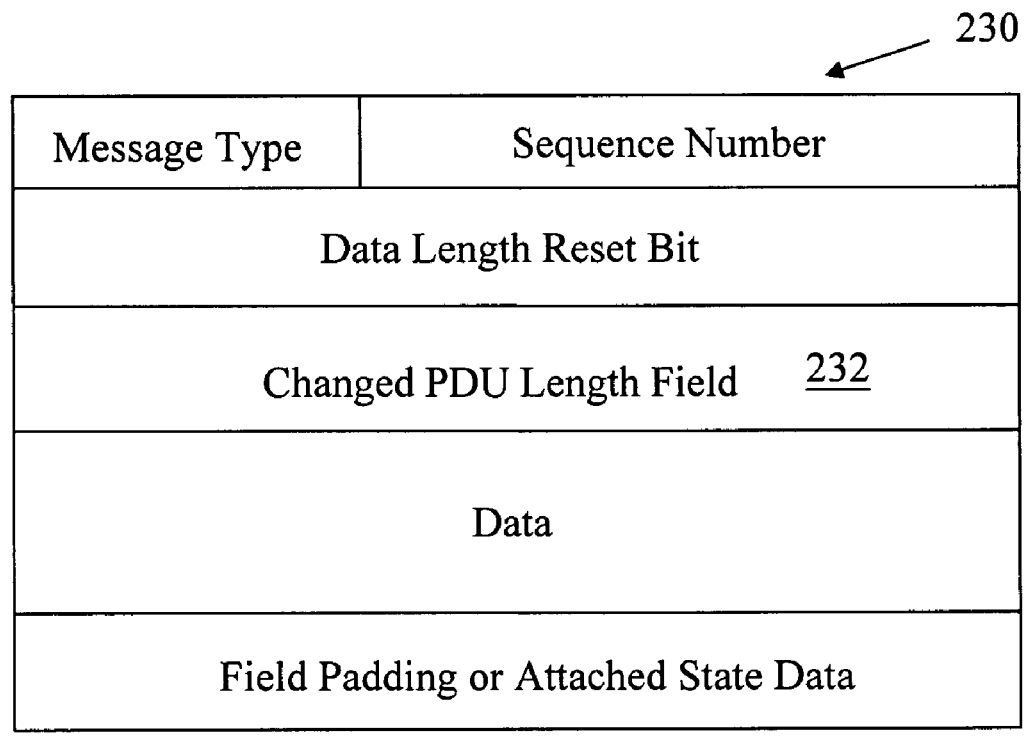
FIG. 2C is a schematic view of a data message length change requirement PDU according to an embodiment of the present invention.

FIG. 2C is a schematic view of a data message length change requirement PDU according to an embodiment of the present invention. Referring to FIG. 2C, the data message length change requirement PDU 230 (briefly referred to as PDU 230) mainly functions to enable the receiving terminal 120 to inform the transmitting terminal 110 to change the length of the PDU 210. The PDU 230 in this embodiment at least includes a changed PDU length field 232. After calculating an appropriate length of the PDU 210, the receiving terminal 120 records the length information in the changed PDU length field 232, and after the transmitting terminal 110 receives the PDU 230, it can obtain the PDU length through the changed PDU length field 232, so as to transmit the PDU 210 with the new PDU length.

Furthermore, the transmitting terminal 110 may also actively send a request for changing the PDU length. After receiving the retransmission request from the receiving terminal 120, the transmitting terminal 110 not only sends out the retransmitted PDU, but also calculates and measures a retransmission rate, and if the rate is changed, the transmitting terminal 110 calculates an appropriate PDU length according to the ber or the BER fed back by the receiving terminal 120. For example, the transmitting terminal 110 records the number of the retransmitted first data message PDU within 1 minute, and supposing 10 first data message PDUs need to be retransmitted within 1 minute, a retransmission rate is calculated as 0.67 PDU/Sec; now supposing the number of the first data message PDUs for being retransmitted within 1 minute is dramatically increased to 100, the retransmission rate is about 6.7 PDU/Sec, and the transmitting terminal 110 is triggered to the adjust the PDU length after knowing that the retransmission rate is dramatically changed. The data acknowledgement message PDU fed back from the receiving terminal 120 is attached with the information such as the ber or the BER of the previous data message PDU, and the transmitting terminal 110 calculates an appropriate PDU length according to the error message information included in the data acknowledgement message. Supposing the calculated reasonable PDU length should be one tenth of the original PDU length, the transmitting terminal 110 defines one tenth of the original PDU length as a new third data message PDU for transmitting data. Similarly, the transmitting terminal 110 further sets the data length reset bit in the third data message PDU as 1 while transmitting data with the third data message PDU, and marks the package length of the third data message PDU in the changed PDU length field 232, so as to inform the receiving terminal 120 to take the third data message PDU length as the predetermined PDU length for receiving.

Figure 3:
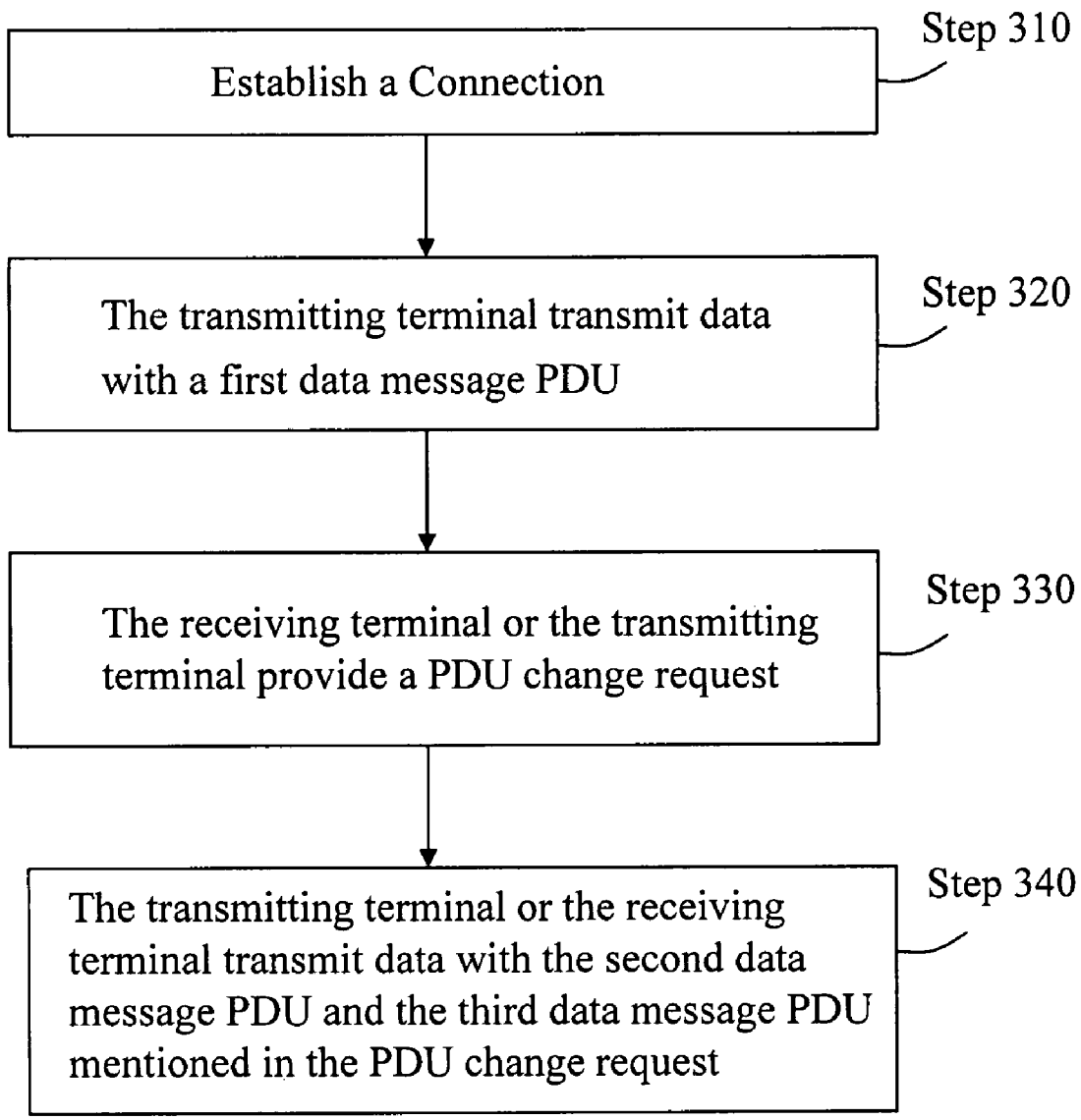
FIG. 3 is a flow chart of a data transmission method for dynamically adjusting a PDU length according to an embodiment of the present invention.

FIG. 3 is a flow chart of a data transmission method for dynamically adjusting a PDU length according to this embodiment. The relationship between the transmitting terminal and the receiving terminal and the flow of the data transmission method of the present invention are described below with reference to FIG. 3. Referring to FIGS. 1 and 3, in this embodiment, the data transmission method includes: (A) establishing a connection between the transmitting terminal and the receiving terminal (Step 310); (B) the transmitting terminal transmitting the data to the receiving terminal with the first data message PDU (Step 320); (C) the receiving terminal providing a PDU change request to the transmitting terminal (Step 330); and (D) the transmitting terminal transmitting the data to the receiving terminal by using the second data message PDU mentioned in the PDU change request.

First, an Acknowledged Mode Radio Link Control (AM RLC) connection is established between the transmitting terminal 110 and the receiving terminal 120. In the WCDMA network, a connection needs to be established before data transmission. Establishing a connection between the transmitting terminal 110 and the receiving terminal 120 includes the following steps. Depending on the circumstance that it is the transmitting terminal 110 or the receiving terminal 120 that initiates to establish a connection, if the transmitting terminal 110 initiates to establish a connection, the transmitting terminal 110 transmits a Radio Resource Control (RRC) message including a plurality of PDU lengths, i.e., types of all the PDU lengths available for being used in the subsequent data transmission. After the transmitting terminal 110 transmits the RRC message, the receiving terminal 120 receives the RRC message, and establishes a type corresponding to the available PDU length.

Then, the transmitting terminal 110 transmits the data to the receiving terminal 120 with the first data message PDU that is configured when establishing the connection. The first data message PDU is the above PDU 210, and the transmitting terminal 110 divides a plurality of batches of data into a plurality of first data message PDUs and then transmits them to the receiving terminal 120. The transmitting terminal 110 sets the data length reset bit of the first data message PDUs as 0, and after receiving the first data message PDU, the receiving terminal 120 takes the length of the first data message PDU as the predetermined PDU length.

Once receiving the first data message PDU transmitted from the transmitting terminal 110, the receiving terminal 120 calculates the ber or BER of the first data message PDU accordingly. Ber may be obtained by way of check sum, whereas the BER may be calculated and obtained through an equation of $BER=(1-(1-ber)^{PDU\ length})$, which are not limited in this embodiment. The transmitting terminal 110 piggybacks the ber or the BER in a PDU change request or a response message to inform the transmitting terminal 110 about the ber or BER of the first data message PDU, wherein the PDU change request is the above PDU 230, and the response message is the above PDU 220. After calculating the ber or the BER, the receiving terminal 120 determines whether to change the currently used PDU length or not according to the calculation result. An excessive large or small PDU length still influences the data transmission. Each transmitted PDU includes a forward message and a real data for being transmitted. Although the correct rate of the data transmission is relatively high if the data is transmitted through the relatively small PDU, repeatedly transmitting the forward message influences the bandwidth utilization. On the contrary, if the data is transmitted through the excessively large PDU length, the repeatedly transmitting of the forward message is saved, but the longer PDU is, the lower the correct rate is, which causes the retransmission of the PDU to be more frequent, thereby indirectly wasting the bandwidth utilization.

In this embodiment, the receiving terminal 120 determines whether to change the currently used PDU length or not according to the calculated ber or BER, and takes a calculated PDU length that achieves the maximum bandwidth utilization as the length of the changed second data message PDU, similarly, this second data message PDU is also the above PDU 210. The bandwidth utilization may be calculated and obtained through the following equation: Bandwidth utilization=$(1-ber)^{PDU\ length}$×(PDU length−PDU header)/PDU length, which is not limited in this embodiment. The receiving terminal 120 calculates bandwidth utilizations of the available PDU types of PDU lengths that are configured in the RRC message when the connection is established, selects a PDU length corresponding to the maximum bandwidth utilization as the length of the changed second data message PDU. After the receiving terminal 120 determines the length of the second data message PDU, it informs the transmitting terminal 110 about the length of the second data message PDU through the PDU change request.

Finally, in Step (D), the transmitting terminal 110 transmits data to the receiving terminal 120 by utilizing the second data message PDU mentioned in the PDU change request, and the transmitting terminal 110 generates the second data message PDU according to the record of the PDU change request, and sets the data length reset bit in the second data message PDU as 1 when transmitting the second data message PDU for the first time, so as to inform the receiving terminal 120 to receive the subsequent PDU with the updated PDU length. After receiving the second data message PDU, the receiving terminal 120 changes the used PDU length.

It should be noted that, besides the circumstance that the transmitting terminal 110 changes to transmit data to the receiving terminal 120 with the second data message PDU according to the PDU change request transmitted from the receiving terminal 120, the transmitting terminal 110 may automatically generate an appropriate PDU length of a third data message PDU according to the ber or the BER fed back from the receiving terminal 120. The third data message PDU, similar to the second data message PDU, is a kind of the data message PDU. The transmitting terminal 110 uses the third data message PDU to transmit data. The steps for the transmitting terminal 110 to transmit data with the third data message PDU are similar to those for transmitting data with the second data message PDU, which thus will not be further described herein any more.

Figure 4:
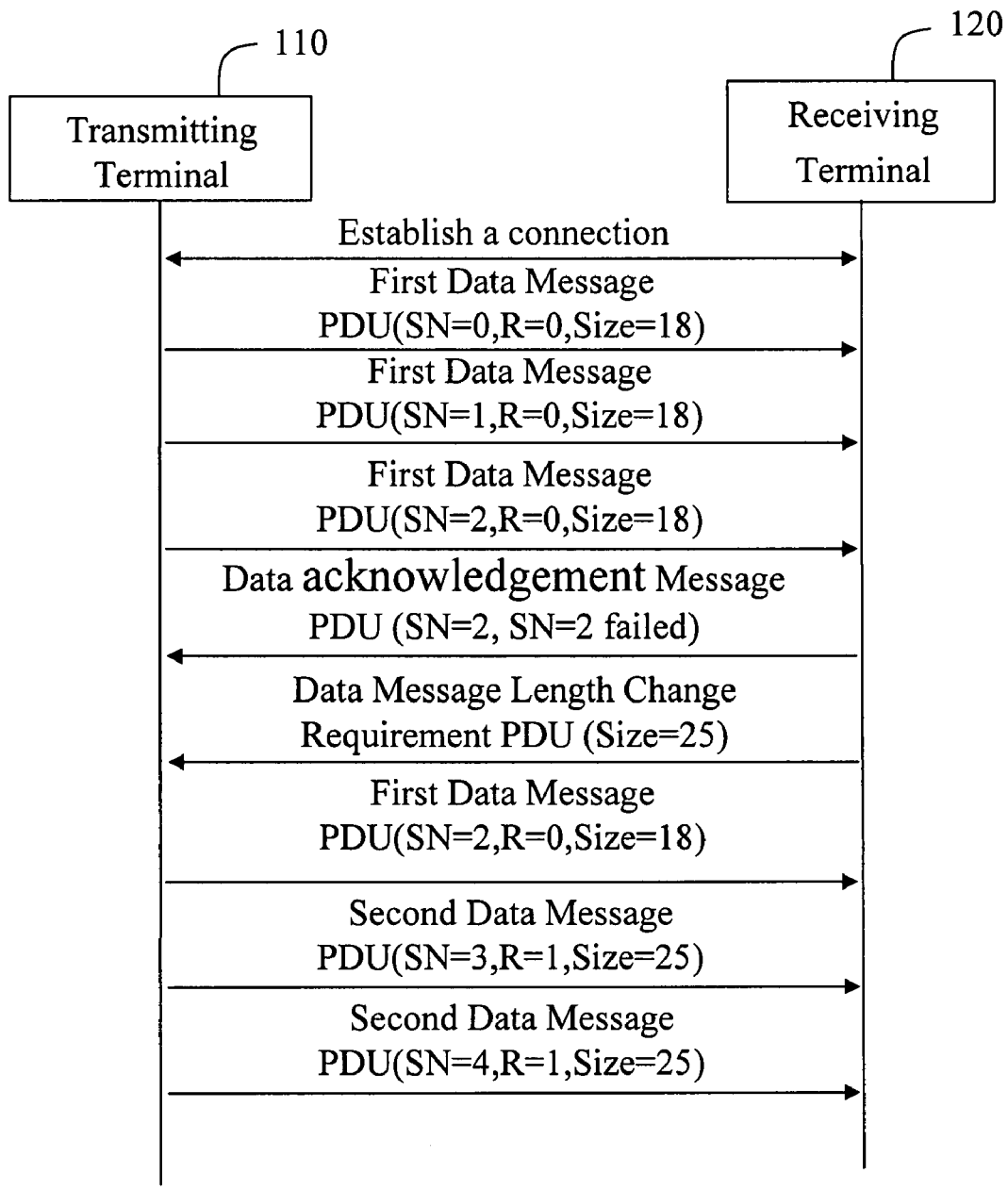
FIG. 4 is a timing chart of the data transmission system and method according to an embodiment of the present invention.

To make the above data transmission method be more clearly understood, a timing chart is taken as an example for illustration. FIG. 4 is a timing chart of the data transmission system and method according to this embodiment. Referring to FIG. 4, first, a connection is established between the transmitting terminal 110 and the receiving terminal 120. Next, the transmitting terminal 110 sequentially transmits the first data message PDUs with the sequence numbers (SN) as 0, 1, 2 to the receiving terminal 120, wherein the used PDU length is 18, and the initial value of the data length reset bit is 0. After receiving the first data message PDUs, the receiving terminal 120 performs the check sum operation, and feeds back the checking result to the transmitting terminal 110 with the data acknowledgement message PDU. In this example, the receiving terminal 120 found that the first data message PDU with the sequence number of 2 needs to be retransmitted, and at this time, the receiving terminal 120 calculates an appropriate PDU length. After the calculation, the receiving terminal 120 informs the transmitting terminal 110, with the data message length change requirement PDU, to transmit data with the second data message PDU having the PDU length of 25. After receiving the data message length change requirement PDU, if the transmitting terminal 110 cannot get read to transmit data with the second data message PDU in real time, it transmits the data with the original first data message PDU. If the transmitting terminal 110 got ready to transmit data with the second data message PDU, it transmits data with the second data message PDU, and at this time, the transmitting terminal 110 sets the data length reset bit as 1 to inform the receiving terminal 120 to change the predetermined PDU length for receiving.

To sum up, the data transmission system and method for dynamically adjusting the PDU length in the present invention, applicable for dynamically adjusting and achieving the most appropriate PDU length according to the ber or the BER of data transmission, has the following advantages.

(1) The data transmission capacity is enhanced without changing the transmission power or the spread factor.

(2) The error rate of the data is reduced.

(3) The other users' resources will not be influenced and occupied.

(4) The present invention is compatible with the current technique.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data transmission method for dynamically adjusting a protocol data unit (PDU) length, applicable to a Wideband Code Division Multiple Access (WCDMA) network at least comprising a transmitting terminal and a receiving terminal, the data transmission method comprising:
   (A) establishing a connection between the transmitting terminal and the receiving terminal;
   (B) the transmitting terminal transmitting data to the receiving terminal with a first data message PDU;
   (C) the receiving terminal or the transmitting terminal providing a PDU change request, further comprising:
      the receiving terminal or the transmitting terminal calculating a bit error rate (ber) or a Block Error Rate (BER) of the received first data message PDU, and informing the transmitting terminal or the receiving terminal about the ber or the BER with the PDU chance request or a response message; and
      the receiving terminal determining whether to change the used PDU length or not according to the ber or the BER, and calculating a PDU length that achieves a maximum bandwidth utilization as the length of the second data message PDU, wherein the receiving terminal informs the transmitting terminal about the length of the second data message PDU through the PDU change request; and
   (D) the receiving terminal using the PDU change request to recalculate a second data message PDU, or the transmitting terminal using the PDU change request to recalculate a third data message PDU to continuously transmit data;
   wherein the method for calculating the PDU length that achieves the maximum bandwidth utilization comprises calculating bandwidth utilizations of the PDU lengths in the RRC message, and then selecting a PDU length corresponding to the maximum value as the PDU length of the maximum bandwidth utilization, wherein the bandwidth utilization is calculated through the following equation:

Bandwidth utilization=$(1-\text{ber})^{PDU\ length}$×(PDU length−PDU header)/PDU length, wherein the PDU header is the header of the PDU.

2. The data transmission method as claimed in claim 1, wherein the connection is an AM RLC connection.

3. The data transmission method as claimed in claim 1, wherein Step (A) further comprises:
   the transmitting terminal or the receiving terminal transmitting a radio resource control (RRC) message comprising a plurality of PDU lengths; and
   the receiving terminal or the transmitting terminal receiving the RRC message, and establishing the corresponding PDU lengths.

4. The data transmission method as claimed in claim 1, wherein Step (B) further comprises:
   the transmitting terminal setting a data length reset bit of the first data message PDU as 0; and
   upon receiving the first data message PDU, the receiving terminal taking the length of the first data message PDU as a used PDU length.

5. The data transmission method as claimed in claim 1, wherein the BER is calculated through the following equation:

BER=$(1-(1-\text{ber})^{PDU\ length})$.

6. The data transmission method as claimed in claim 1, wherein Step (D) further comprises:
   the transmitting terminal setting the length of the second data message PDU according to the received PDU change request, and setting the data length reset bit of the second data message PDU as 1, when transmitting the second data message PDU for the first time; and
   the receiving terminal changing the used PDU length, when receiving the second data message PDU with the data length reset bit as 1.

7. The data transmission method as claimed in claim 1, further comprising:
   when the transmitting terminal found that an average error rate or a retransmission request rate of the first data message PDU is changed, calculating an appropriate PDU length as a length of the third data message PDU according to the ber fed back by the receiving terminal, and transmitting data with the third data message PDU;
   wherein when transmitting the third data message PDU for the first time, the transmitting terminal sets a data length reset bit of the third data message PDU as 1.

8. The data transmission method as claimed in claim 7, wherein:
   the first data message PDU, the second data message PDU, and the third data message PDU belong to a data message PDU, and the data message PDU is transmitted from the transmitting terminal to the receiving terminal, for carrying data required for being transmitted by an upper layer; and
   the PDU change request is a data message length change requirement PDU, for informing the transmitting terminal or the receiving terminal to adjust the data transmission message PDU.

9. A computer-readable recording medium, for storing a computer program code for the computer to execute the following steps between a transmitting terminal and a receiving terminal of a Wideband Code Division Multiple Access (WCDMA) network:
   (A) establishing a connection between the transmitting terminal and the receiving terminal;
   (B) the transmitting terminal transmitting data to the receiving terminal with a first data message PDU;
   (C) the receiving terminal or the transmitting terminal providing a PDU change request, further comprising:
      the receiving terminal or the transmitting terminal calculating a ber or a BER of the received first data message PDU, and informing the transmitting terminal or the receiving terminal about the ber or the BER through the PDU change request or a response message; and the receiving terminal determining whether to change the used PDU length or not according to the ber or the BER, and calculating a PDU length that achieves a maximum bandwidth utilization as the length of the second data message PDU, wherein the receiving terminal informs the transmitting terminal about the length of the second data message PDU through the PDU change request; and (D) the receiving terminal using the PDU change request to recalculate a second data message PDU, or the transmitting terminal using the PDU change request to recalculate a third data message PDU to continuously transmit data;

wherein the method for calculating the PDU length that achieves the maximum bandwidth utilization comprises calculating bandwidth utilizations of the PDU lengths in the RRC message, and selecting a PDU length corresponding to the maximum value as the PDU length of the maximum bandwidth utilization, wherein the bandwidth utilization is calculated through the following equation:

$$\text{Bandwidth utilization} = (1-\text{ber})^{PDU\ length} \times (PDU\ length - PDU\ header)/PDU\ length,$$

wherein the PDU header is the header of the PDU.

10. The computer-readable recording medium as claimed in claim 9, wherein the connection is an AM RLC connection.

11. The computer-readable recording medium as claimed in claim 9, wherein Step (A) further comprises:

the transmitting terminal or the receiving terminal transmitting a RRC message comprising a plurality of PDU lengths; and the receiving terminal or the transmitting terminal receiving the RRC message, and establishing the corresponding PDU lengths.

12. The computer-readable recording medium as claimed in claim 9, wherein Step (B) further comprises:

the transmitting terminal setting a data length reset bit of the first data message PDU as 0; and upon receiving the first data message PDU, the receiving terminal taking a length of the first data message PDU as a used PDU length.

13. The computer-readable recording medium as claimed in claim 9, wherein the BER is calculated through the following equation:

$$\text{BER} = (1 - (1-\text{ber})^{PDU\ length}).$$

14. The computer-readable recording medium as claimed in claim 9, wherein Step (D) further comprises:

the transmitting terminal setting the length of the second data message PDU according to the received PDU change request, and setting a data length reset bit of the second data message PDU as 1 when transmitting the second data message PDU for the first time; and the receiving terminal changing the used PDU length when receiving the second data message PDU with the data length reset bit as 1.

15. The computer-readable recording medium as claimed in claim 9, further comprising:

when the transmitting terminal found that an average error rate or a retransmission request rate of the first data message PDU is changed, calculating an appropriate PDU length as a length of a third data message PDU according to the ber fed back by the receiving terminal, and transmitting data with the third data message PDU;

wherein when transmitting the third data message PDU for the first time, the transmitting terminal sets a data length reset bit of the third data message PDU as 1.

16. The computer-readable recording medium as claimed in claim 15, wherein:

the first data message PDU, the second data message PDU, and the third data message PDU belong to a data message PDU, and the data message PDU is transmitted from the transmitting terminal to the receiving terminal, for carrying data required for being transmitted by an upper layer; and the PDU change request is a data message length change requirement PDU, for informing the transmitting terminal or the receiving terminal to adjust the data transmission message PDU.

* * * * *